(12) United States Patent
Hemmingson

(10) Patent No.: US 7,775,144 B2
(45) Date of Patent: Aug. 17, 2010

(54) DISC SAW BLADE

(75) Inventor: Olle Hemmingson, Hallen (SE)

(73) Assignee: Bracke Forest AB, Bracke (SE)

( * ) Notice: Subject to any disclaimer, the term of this patent is extended or adjusted under 35 U.S.C. 154(b) by 214 days.

(21) Appl. No.: 10/576,560

(22) PCT Filed: Oct. 13, 2004

(86) PCT No.: PCT/SE2004/001464

§ 371 (c)(1),
(2), (4) Date: Nov. 6, 2006

(87) PCT Pub. No.: WO2005/037502

PCT Pub. Date: Apr. 28, 2005

(65) Prior Publication Data

US 2007/0062362 A1   Mar. 22, 2007

(30) Foreign Application Priority Data

Oct. 20, 2003   (SE) ..................... 0302761

(51) Int. Cl.
B27B 33/02 (2006.01)
B26D 7/08 (2006.01)
A01G 23/08 (2006.01)
B23D 57/02 (2006.01)

(52) U.S. Cl. .............. 83/830; 83/833; 83/169; 144/4.1; 30/38

(58) Field of Classification Search ............ 83/830, 83/169, 833, 661, 820, 834; 29/428; 30/381; 144/4.1, 341, 218

See application file for complete search history.

(56) References Cited

U.S. PATENT DOCUMENTS

| 2,725,083 | A | * | 11/1955 | Ackley | 83/834 |
| 2,958,348 | A | * | 11/1960 | Bueneman | 83/838 |
| 3,189,064 | A | * | 6/1965 | Frederickson | 83/834 |
| 3,269,431 | A | * | 8/1966 | Ehlen | 30/138 |
| 4,744,148 | A |   | 5/1988 | Brown | |
| 5,048,389 | A | * | 9/1991 | Carlton | 83/838 |
| 5,090,287 | A |   | 2/1992 | Chezem | |
| 6,748,840 | B2 | * | 6/2004 | Harfst | 83/830 |

FOREIGN PATENT DOCUMENTS

| DE | 2413202 A | 10/1974 |
| EP | 0 377 421 A1 | 7/1990 |
| EP | 0377421 A1 | 7/1990 |
| EP | 0387429 A1 | 9/1990 |

* cited by examiner

Primary Examiner—Ghassem Alie
Assistant Examiner—Bharat C Patel
(74) Attorney, Agent, or Firm—Buchanan Ingersoll & Rooney PC

(57) ABSTRACT

A disc saw blade includes a saw chain mounted around the circumference of a circular disk, which saw chain is provided with driving links, connecting links and cutting links. Due to the driving links, the chain is guided in at least one chain groove arranged around the periphery of the disk. The bottom of the groove has radial projections distributed around the circumference, and the driving link has a cam surface on a projecting part that projects radially inwards, for interaction with the respective radial projection. The chain can move from a neutral position, in which the respective projecting part is loosely disposed between two adjacent radial projections, to a working position, in which the respective cam surfaces are in contact with the associated radial projections.

8 Claims, 5 Drawing Sheets

DISC SAW BLADE

BACKGROUND

Figure 1:
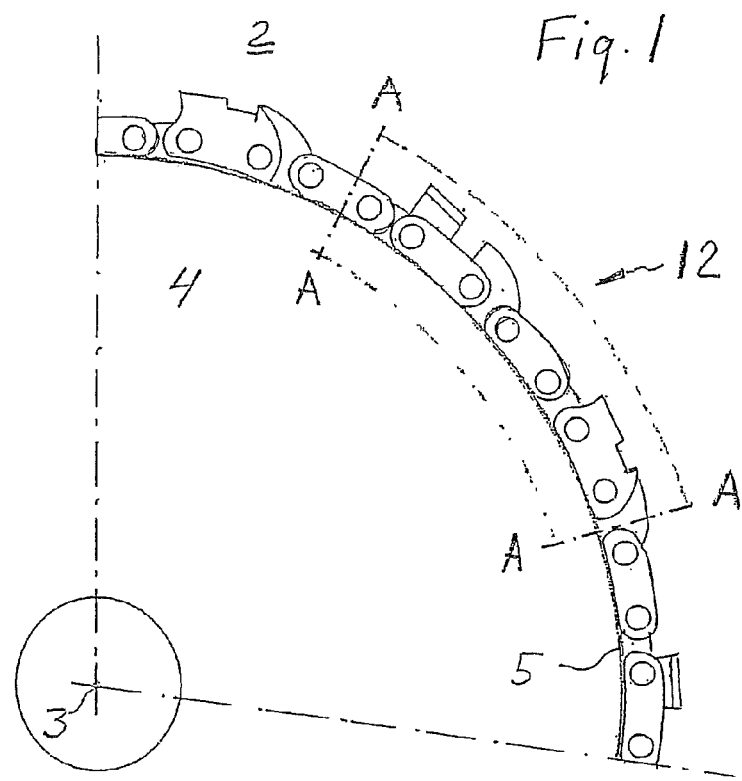

The invention relates to a disc saw blade.

Hydraulic cutter blades or crosscut chain saws are currently used for various crosscutting purposes within the forestry industry, for example for units mounted in the crane end of harvesters, forwarders, excavators or suitable machines of other types. A great problem with crosscut chain saws is the difficulty of cutting several small trees simultaneously without breaking the saw bar and the chain. It is therefore desirable to use a disc saw blade instead, which works considerably faster than both the hydraulic cutter blade and the crosscut chain saw, as the trees are cut using the same working method as with a conventional clearing saw. By this means, it is possible, for example, to fell fuel wood in neglected clearing areas and to carry out roadside visibility clearance and clearing of power line paths, etc, in an efficient way. Conventional disc saw blades have as a rule, however, fixed or removable cutting edges of hard metal. A disadvantage of this type of disc saw blade is that it must be dismantled and sent to be repaired after it has hit a stone.

If, instead, a disc is used that has a standard saw chain tensioned around its circumference, a plurality of advantages are obtained in comparison to conventional disc saw blades. There has been strong competition between different manufacturers in the development of saw chains with the result that saw chains offer good value for money. A stone-damaged chain can be replaced by a newly-sharpened chain in just a few minutes. Electrical chain sharpeners, both manual and automatic, are already to be found at the premises of most forestry contractors and power saw workshops. It is therefore possible to keep chains sharpened at a low cost, which, in addition to better functioning, also reduces the power requirement of the machine. A disc saw blade of this type is described in U.S. Pat. No. 4,627,322. The disc saw blade described in this patent document is provided with a saw chain tensioned around a plate device. The plate device is designed with a first and a second plate and the chain is guided via its driving links in a chain groove that is delimited peripherally between the plates. The chain is held in the chain groove by frictional engagement between the driving links and the interconnected plates.

A disadvantage of this previously-known disc saw blade is that changing the chain is relatively time-consuming and can require access to special tools, as the plates in the plate device must be dismantled in order to release the chain. This work can be difficult to carry out in a workplace that is outdoors and exposed to wind and rain. In addition, in certain cases it can be necessary for the chain to be tensioned with a special chain tensioner that weakens the chain.

An object of the invention is therefore to achieve a disc saw blade that can be kept sharpened by simple conventional measures in a more cost-effective way than was previously the case.

BRIEF DISCRIPTION OF THE DRAWINGS

Figure 4:
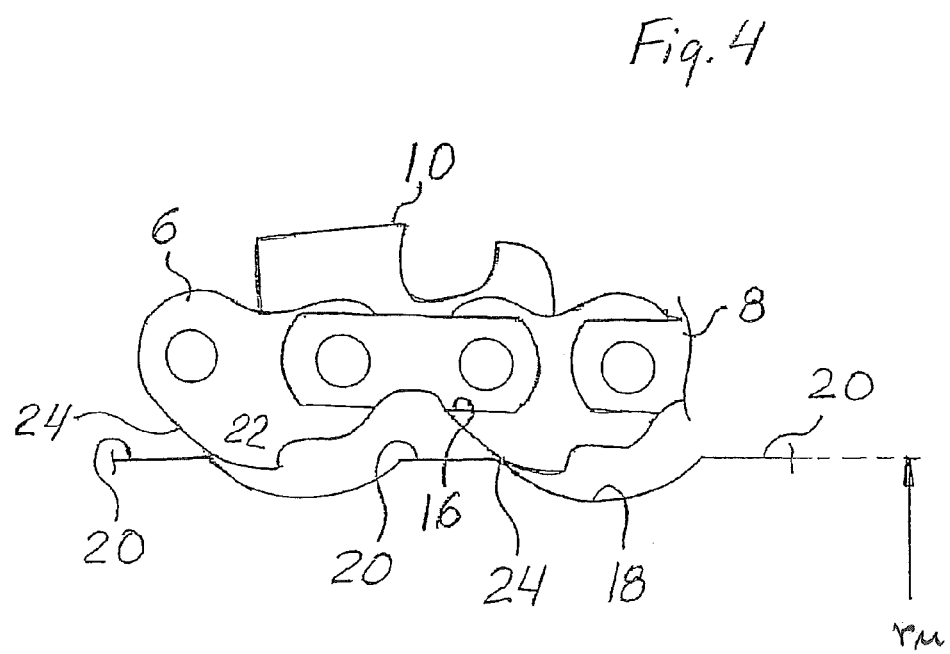
Figure 2:
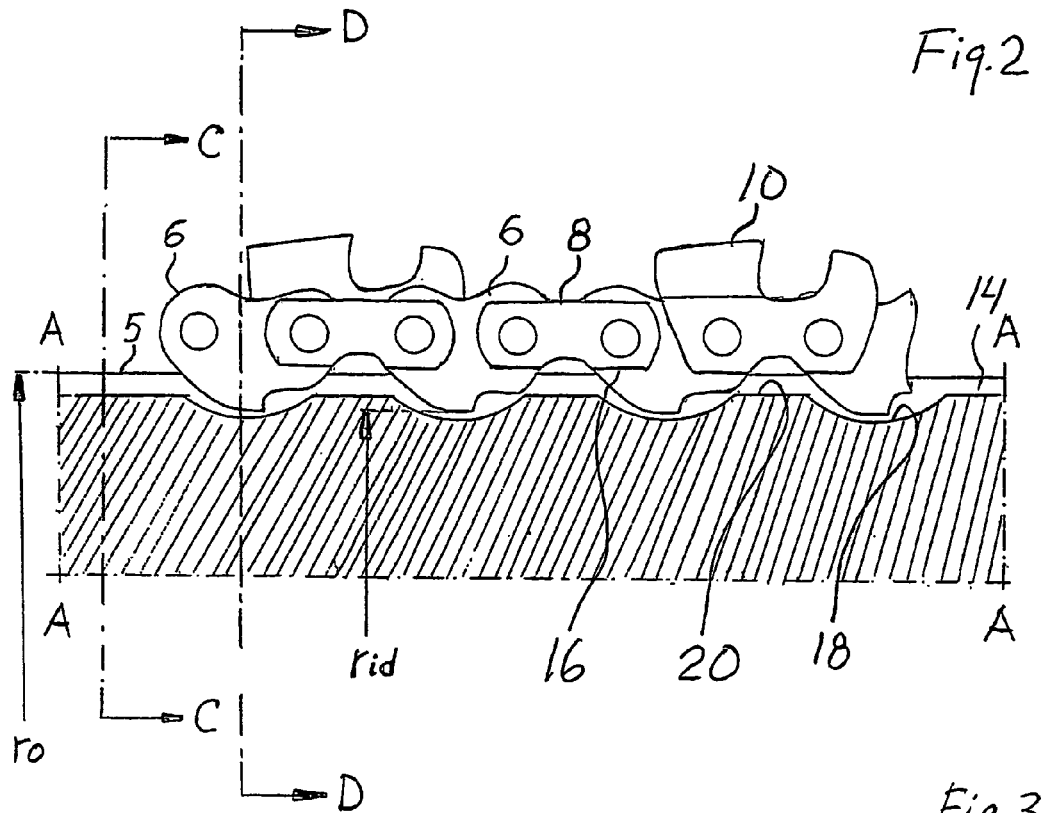
Figure 3:
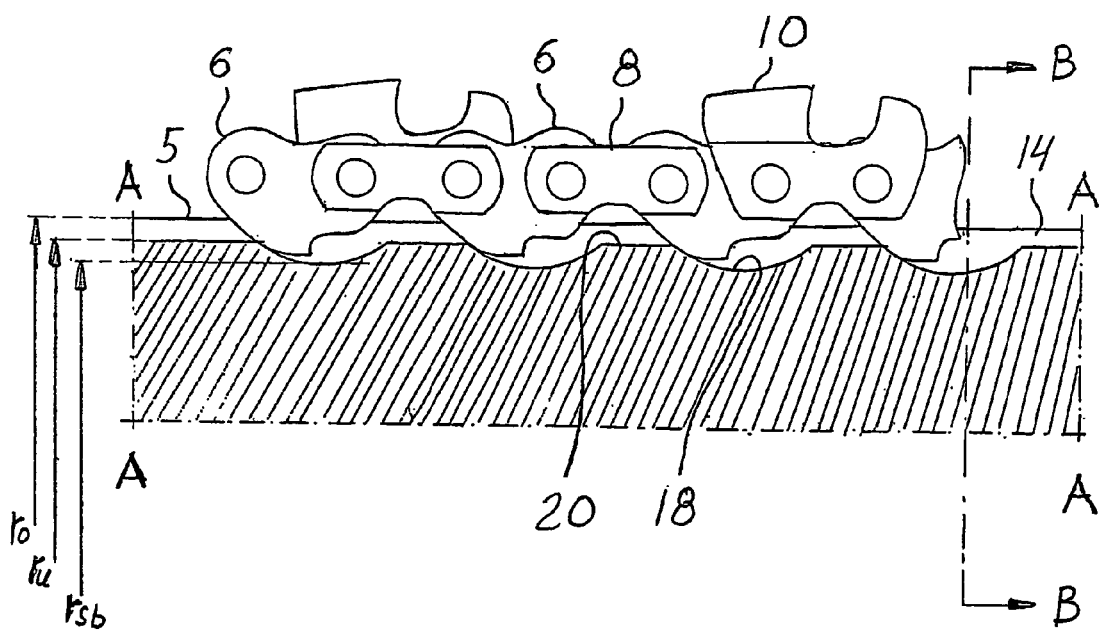
Figure 5:
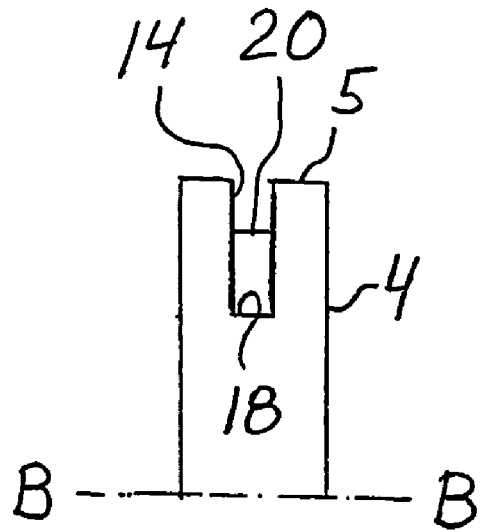
Figure 6:
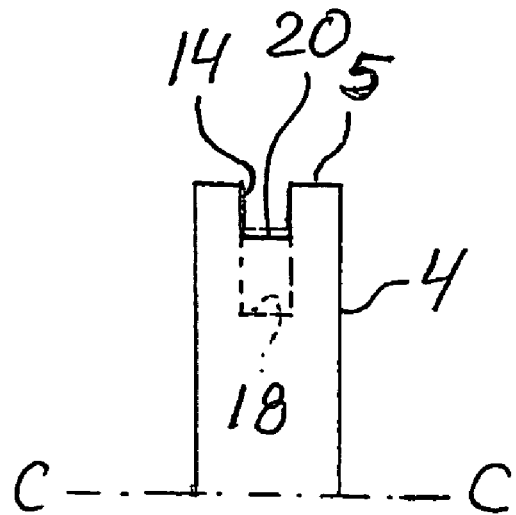
Figure 7:
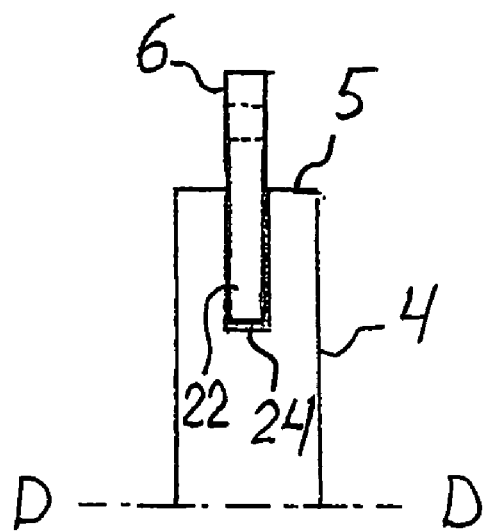
Figure 8:
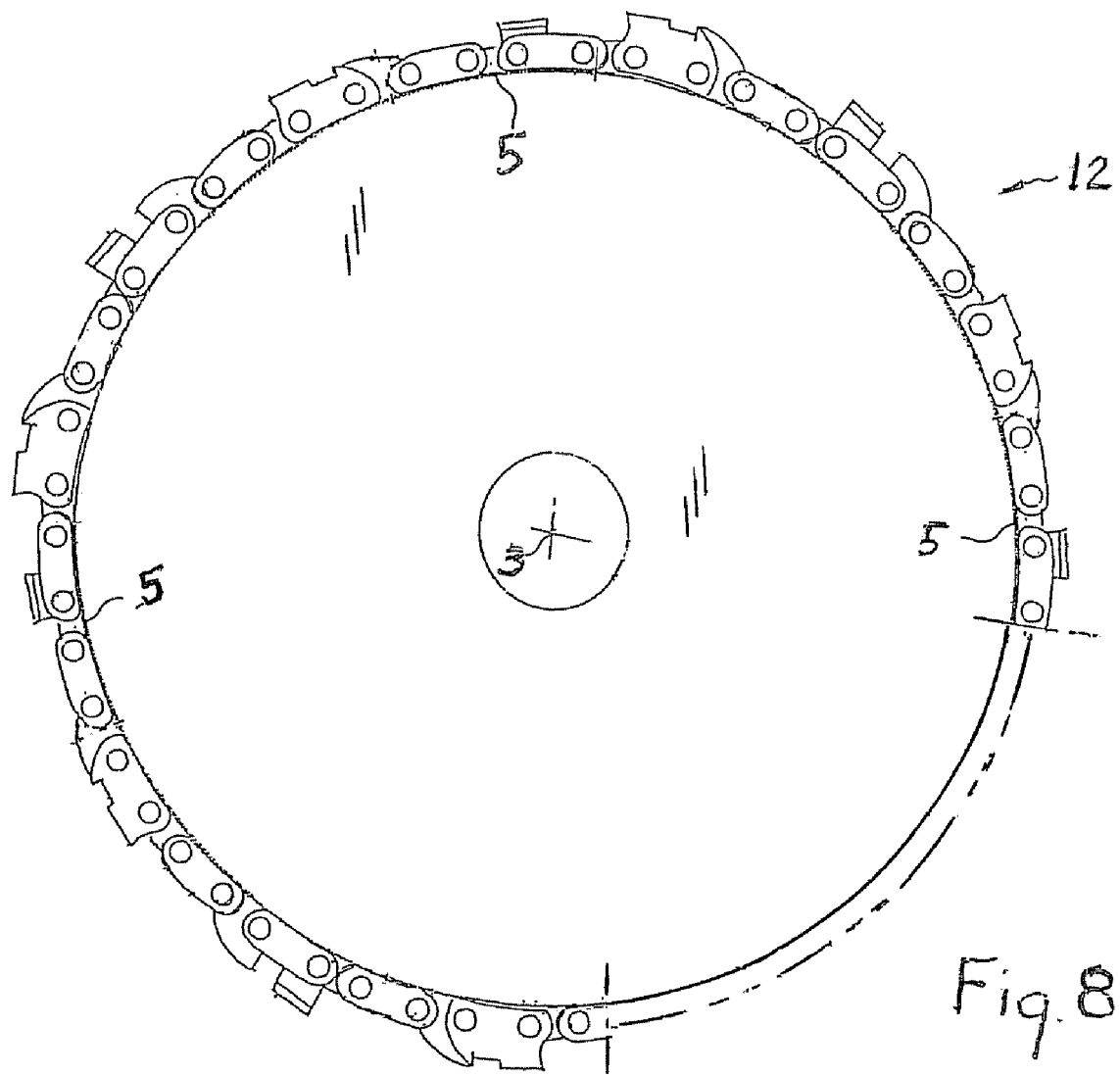
Figure 9:
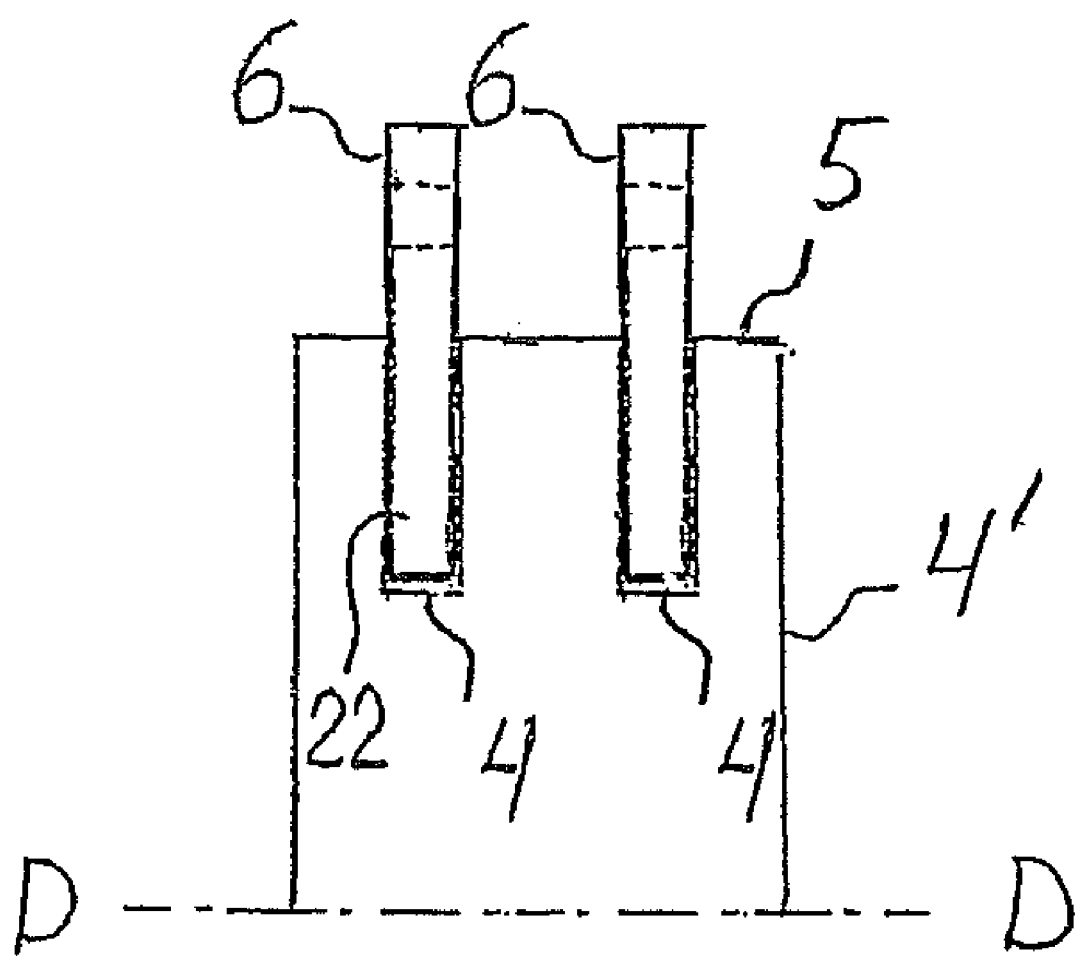

A disc saw blade according to the invention is described in greater detail in the following description, with reference to the attached schematic drawings. FIG. 1 is a plan view that shows a sector of the disc saw blade with mounted chain, FIG. 2 is an enlarged view cut through to the centre of the disc groove that shows a straightened-out section A-A of the disc saw blade with the chain in a neutral position, and FIG. 3 shows a view similar to FIG. 2, but with the chain in a working position, FIG. 4 is an additional enlarged view of components in FIG. 3, FIG. 5 shows a cross-section through the chain groove in the circumference part of the circular disk along the line B-B in FIG. 3, FIG. 6 shows a cross-section through the chain groove in the circumference part of the circular disk along the line C-C in FIG. 2 and FIG. 7 shows a cross-section through the chain groove with driving links in the circumference part of the circular disk along the line D-D in FIG. 2. FIG. 8 is a view similar to FIG. 1 showing that the chain extends 360 degrees around the disc.

DETAILED DISCRIPTION OF THE EMBODIMENTS

The drawings show a disc saw blade 2 with a circular disk 4 around a centre point 3, with a conventional saw chain 12 mounted around the circumference 5 of the circular disk, which saw chain has driving links 6, connecting links 8 and cutting links 10. A peripheral chain groove 14 is machined in the circumference 5 of the disk 4 for this purpose. Each connecting link 8 has an elongated edge 16 which faces towards the circumference 5.

Alternatively, two or more parallel grooves not shown can be machined, depending upon whether one or more saw chains are to be used. Where applicable, the disk 4' is designed with a correspondingly greater thickness. As, when two or more saw chains are used, each groove is designed in a similar way to when a single saw chain is used, for the sake of clarity the disc saw blade 2 shown in this embodiment is of the latter type.

The groove 14, or where applicable the grooves, are each first machined to only approximately half the depth X from the circumference 5 that is required for the driving links 6. Level with the centre of each driving link 6 there is, in addition, a recess 18 with a curved outer surface that is milled out to a depth that corresponds to the other half of the depth X that is required for the driving links. From the centre point 3 of the disk, the radius is the length $r_o$ to the circumference 5, $r_{sb}$ to the respective recess that constitutes the bottom 18 of the groove, and $r_u$ to the radial projection 20, formed between the recesses. $X=r_o-r_{sb}$. This depth X that is required for the driving links is marginally larger than a distance $S_{id}=r_o-r_{id}$, that each driving link 6 extends radially inwards, by means of a part 22 that projects radially inwards, from the respective edge 16 of the connecting links 8, when the edge 16 is in contact with the circumference 5 of the disk 4.

In radial cross-section, each projection 20 is preferably designed as a truncated cone, with a complimentary shape to the cam surface 24 on the part 22 of the interacting driving link 6 that projects radially inwards. Within the framework of the invention, however, each projection can also have other shapes. Thus, in radial cross-section, each projection can be the shape of a lug, a pyramid, a dome, etc, and can, in its simplest form, be constructed by a welding bead 20 arranged at the bottom 18 of the groove 14.

In other words, the groove 14 has a bottom 18 that is provided with radial projections 20 that are evenly distributed around the circumference. The part 22 of the driving link 6 that projects radially inwards has a rounded back edge, facing in the opposite direction to the cutting direction of the saw chain 12, which constitutes a cam surface 24 that can slide over the associated projection 20. When it slides over the projection 20, the cam surface 24 is pressed radially outwards by the projection until the saw chain 12 is tensioned and is held onto the disk 4 as a result of its shape.

The saw chain 12 can be mounted on the circular disk 4 with the driving links 6 projecting radially inwards into the groove 14. By moving the saw chain 12 in the groove 14 along the circumference of the disk 4 until each driving link 6 comes in the centre of a recess 18, the saw chain 12 can be joined together in a conventional way with two securing plates (not shown) and thus does not need to be tensioned very tightly. The length of the saw chain 12 and the circumference radius $r_o$ of the disk 4 are related in such a way that, when the saw chain is mounted, the radius $r_{id}$ to the part 22 of each driving link of the chain that projects radially inwards is greater than the radius $r_{sb}$ to the bottom of the groove and smaller than the radius $r_u$ to each projection. That is apparent from FIG. 2. which demonstrates that in the neutral (non-driven) position of the disc, the saw chain is only loosely mounted on the disc, and there exists play between the saw chain and the disc in both the radial direction and the circumferential direction.

By this means, when the disc saw blade 2 is caused to rotate and the cutting links 10 are cutting, the driving links 6 of the saw chain 12, which in the standard version have a rounded back edge, are pressed into contact with the corresponding projections 20 of the disk 4. Each of the rounded back edges or cam surfaces 24 is then pressed radially outwards by the respective projection 20, whereby the saw chain 12 is tensioned and rotates with the disk 4. In other words, this design has a function with automatic chain tensioning, that tensions the chain optimally.

Even though the disc saw blade has optimal rotation characteristics and runs most smoothly when the bottom of the groove has one projection for each driving link, it is also possible, for use with relatively soft material or material with a relatively small diameter, to arrange a smaller number of projections distributed evenly around the circumference of the disk.

The invention claimed is:

1. A disk saw blade having a circular saw chain mounted around the circumference of a circular disc, the saw chain comprising driving links, connecting links and cutting links, wherein the chain is guided by the driving links in at least one chain groove arranged around the periphery of the disc, and a projecting part of each driving link projects radially inwards to make contact with the bottom of the groove, wherein the bottom of the groove has radial projections distributed around the disc circumference and the driving link has a cam surface on the part that projects radially inwards for interaction with a respective radial projection, wherein the chain when driven, moves from a neutral position in which the chain is loosely mounted around the circumference of the disc and the projecting part of the respective driving link is loosely inserted between two adjacent radial projections, to a working position in which the chain is tensioned around the circumference of the disc and the cam surface on the respective driving link is in contact with the associated radial projection, wherein the length of the saw chain is matched to the radius ($r_0$) of the disc, so when the saw chain and the disc are arranged concentrically in the neutral position, the saw chain is loosely mounted in the circumferential direction of the disc, wherein a radius ($r_{sb}$) to the bottom of the groove of each driving link is shorter than a radius ($r_{id}$) to the projecting part measured along the same radial line as said radius ($r_{sb}$) and shorter than a radius ($r_u$) to a radially outer end of each projection, wherein the cam surface on each driving link is designed to cause the saw chain to be displaced generally radially outwards along a respective radial projection by a camming action of the radial projection during rotation of the disk to take-up the circumferential looseness and tension the saw chain in a way that the chain is held onto the disc as a result of the tension created by the camming action.

2. The disc saw blade according to claim 1, wherein the bottom of the groove has a predetermined number of projections distributed evenly around the circumference of the disc.

3. The disc saw blade according to claim 1, wherein the bottom of the groove has one projection for each driving link.

4. The disc saw blade according to claim 1, wherein a radial cross-section of each projection is lug shaped.

5. The disc saw blade according to claim 1, wherein a radial cross-section of each projection is pyramid shaped.

6. The disc saw blade according to claim 1, wherein a radial cross-section of each projection is dome shaped.

7. The disc saw blade according to claim 1, wherein a radial cross-section of each projection is designed as a truncated cone having a complementary shape to the cam surface of the interacting driving link.

8. The disc saw blade according to claim 1, wherein the connecting links are spaced entirely radially outwardly with respect to radially outermost portions of the radial projections when the chain is in said neutral position, and when the chain is being driven.

* * * * *